(12) United States Patent
Peterson

(10) Patent No.: US 8,040,092 B2
(45) Date of Patent: Oct. 18, 2011

(54) POWER SUPPLY TOPOLOGY FOR A MULTI-PROCESSOR CONTROLLER IN AN ELECTRIC TRACTION SYSTEM

(75) Inventor: Ted D. Peterson, Playa Del Rey, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 507 days.

(21) Appl. No.: 12/276,927

(22) Filed: Nov. 24, 2008

(65) Prior Publication Data

US 2010/0127650 A1    May 27, 2010

(51) Int. Cl.
*H02P 6/14* (2006.01)
*G05F 1/00* (2006.01)
*H02J 1/00* (2006.01)

(52) U.S. Cl. .............. 318/400.26; 318/139; 323/273; 323/282

(58) Field of Classification Search .............. 318/139, 318/400.26; 323/224, 225, 273, 282, 313, 323/315, 351, 910
See application file for complete search history.

(56) References Cited

U.S. PATENT DOCUMENTS

| | | | | |
|---|---|---|---|---|
| 4,604,528 A * | 8/1986 | Norton | .......................... | 307/9.1 |
| 4,636,706 A * | 1/1987 | Bowman et al. | ................ | 322/28 |
| 4,992,672 A * | 2/1991 | Norton | ......................... | 307/10.1 |
| 6,384,551 B1 * | 5/2002 | Watanabe | ..................... | 318/139 |
| 6,603,287 B2 * | 8/2003 | Morimoto et al. | ............ | 320/150 |
| 6,624,531 B2 * | 9/2003 | Disser et al. | .................. | 307/10.1 |
| 6,664,767 B2 * | 12/2003 | Takahashi et al. | .............. | 322/28 |
| 6,737,834 B2 * | 5/2004 | Pierret et al. | .................... | 322/28 |
| 2002/0014881 A1 * | 2/2002 | Asada | ............................ | 323/273 |
| 2002/0024314 A1 * | 2/2002 | Takahashi et al. | ............ | 318/601 |
| 2002/0163456 A1 * | 11/2002 | Dedic | ............................ | 341/144 |
| 2004/0095667 A1 * | 5/2004 | Jain et al. | ........................ | 360/67 |

* cited by examiner

*Primary Examiner* — Walter Benson
*Assistant Examiner* — Gabriel Agared
(74) *Attorney, Agent, or Firm* — Ingrassia Fisher & Lorenz, P.C.

(57) ABSTRACT

A multi-processor controller is provided. The multi-processor controller can be used to control the operation of an inverter in a vehicle-based electric traction system. The multi-processor controller includes a first processor device having a first supply voltage node, a second processor device having a second supply voltage node, a first voltage regulator, and a second voltage regulator. The first voltage regulator has a first output voltage node coupled to the first supply voltage node, and the first voltage regulator is configured to generate a first regulated supply voltage for the first processor device. The second voltage regulator has a second output voltage node coupled to the second supply voltage node, and the second voltage regulator is configured to generate a second regulated supply voltage for the second processor device.

20 Claims, 2 Drawing Sheets

US 8,040,092 B2

POWER SUPPLY TOPOLOGY FOR A MULTI-PROCESSOR CONTROLLER IN AN ELECTRIC TRACTION SYSTEM

TECHNICAL FIELD

Embodiments of the subject matter described herein relate generally to electric drive systems for vehicles. More particularly, embodiments of the subject matter relate to power supply architectures for control processors utilized in an electrical inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide direct current (DC) power. Thus, devices known as "power inverters" are used to convert the DC power into AC power. Such power inverters often utilize several switches, or transistors, operated at various intervals to convert the DC power to AC power.

Typically, the switches of the inverter are operated by using pulse-width modulation (PWM) techniques to control the amount of current and/or voltage provided to the electric motor. Often, a microprocessor architecture or control module generates PWM signals for the switches in the inverter, and provides the PWM signals to a gate driver, which turns the switches on and off. Some inverter controller modules utilize multiple processor chips mounted on a circuit board. Traditional multi-processor controller deployments for vehicle-based inverter systems utilize a single voltage regulator component that provides the regulated supply voltages to all of the processor devices. Reliance on a single voltage regulator component can be troublesome because the operation of all processor devices will be dependent upon that single component. In addition, a single voltage regulator that drives multiple processor devices can result in a high concentration of heat on the controller circuit board, and it may be difficult to effectively and efficiently dissipate the thermal energy generated by the voltage regulator.

BRIEF SUMMARY

A multi-processor controller is provided for an inverter of an electric drive system in a vehicle. The controller utilizes distinct and physically separate voltage regulators for the processor devices, rather than a single voltage regulator component. Each voltage regulator can provide the regulated supply voltage to any number of physically distinct processor devices. This power supply topology can improve the robustness of the multi-processor controller, while resulting in improved thermal dissipation.

A multi-processor controller for an inverter in an electric traction system of a vehicle is provided. The multi-processor controller includes a first processor device having a first supply voltage node, a second processor device having a second supply voltage node, a first voltage regulator, and a second voltage regulator. The first voltage regulator has a first output voltage node coupled to the first supply voltage node, and the first voltage regulator is configured to generate a first regulated supply voltage for the first processor device. The second voltage regulator has a second output voltage node coupled to the second supply voltage node, and the second voltage regulator is configured to generate a second regulated supply voltage for the second processor device. The first processor device and the second processor device are configured to control operation of the inverter.

An electric drive system for a vehicle is also provided. The electric drive system includes an energy source, an electric motor, an inverter coupled between the energy source and the electric motor, the inverter being configured to convert direct current from the energy source into alternating current for the electric motor, and a multi-processor controller coupled to the inverter. The multi-processor controller includes a plurality of processor devices grouped into a plurality of mutually exclusive subsets and configured to control operation of the inverter to achieve a desired power flow between the energy source and the electric motor. The multi-processor controller also includes a plurality of voltage regulators, each being configured to generate a respective regulated supply voltage for a different one of the mutually exclusive subsets.

Also provided is a multi-processor controller having a first voltage regulator configured to generate a first regulated supply voltage at its output node, a second voltage regulator configured to generate a second regulated supply voltage at its output node, a first plurality of processor devices, and a second plurality of processor devices. Each of the first plurality of processor devices has a respective supply voltage node coupled to the output node of the first voltage regulator to receive the first regulated supply voltage, and each of the second plurality of processor devices has a respective supply voltage node coupled to the output node of the second voltage regulator to receive the second regulated supply voltage.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology may be used in the following description for the purpose of reference only, and such use is not intended to be limiting. For example, the terms "first," "second," and similar numerical terms referring to elements, structures, or components do not imply a sequence, order, preference, or priority, unless clearly indicated by the context. Such terminology may include the words specifically mentioned above, derivatives thereof, and words of similar import.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

Figure 1:
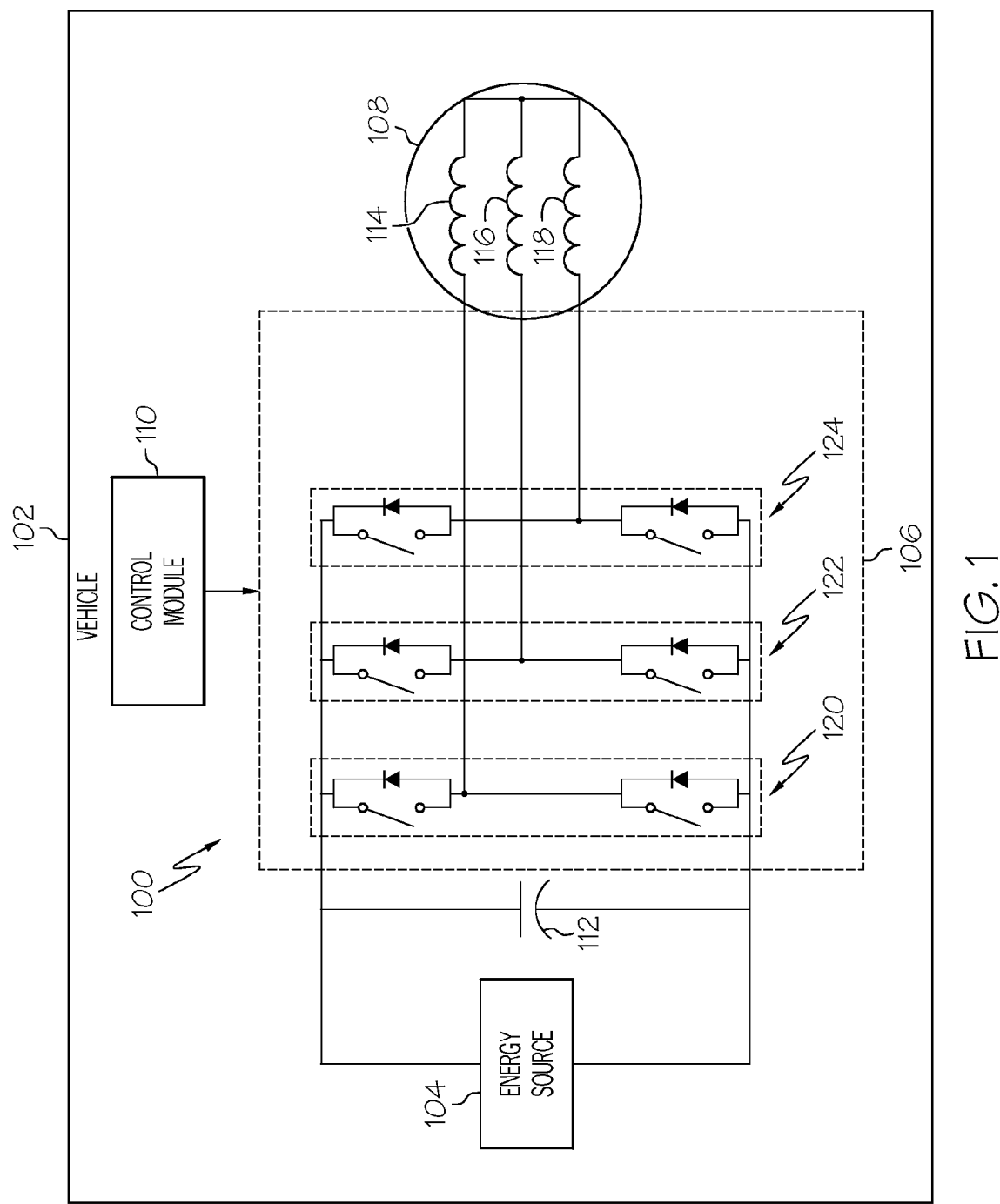
FIG. 1 is a schematic representation of an embodiment of an electric drive system suitable for use in a vehicle.

FIG. 1 is a schematic representation of an embodiment of an electric drive system 100 suitable for use in a vehicle 102. The vehicle 102 is preferably realized as an automobile, such as, for example, a sedan, a wagon, a truck, or a sport utility vehicle, and vehicle 102 may be a two wheel drive vehicle (e.g., rear wheel drive or front wheel drive), a four wheel drive vehicle, or an all wheel drive vehicle. The vehicle 102 may also incorporate any one of, or combination of, a number of different types of engines, such as, for example, a gasoline or diesel fueled combustion engine, a "flex fuel vehicle" engine (e.g., an engine that uses a mixture of gasoline and alcohol for fuel), a gaseous compound (e.g., hydrogen and natural gas) fueled engine, a combustion/electric motor hybrid engine, and an electric motor.

In an exemplary embodiment, electric drive system 100 includes, without limitation: an energy source 104, a power inverter module 106, a motor 108, and a control module 110. A capacitor 112 may be coupled between energy source 104 and power inverter module 106 such that capacitor 112 and energy source 104 are electrically parallel. In this regard, capacitor 112 may alternatively be referred to as a direct current (DC) link capacitor or bulk capacitor. In an exemplary embodiment, control module 110 operates power inverter module 106 to achieve a desired power flow between energy source 104. For the sake of brevity, conventional techniques related to vehicle-based electric traction/drive systems, power inverters, inverter controllers, and other functional aspects of the systems (and the individual operating components of the systems) may not be described in detail herein.

Energy source 104 may comprise a battery, a battery pack, a fuel cell, a fuel cell stack, an ultracapacitor, a controlled generator output, or another suitable DC voltage source. A battery may be any type of battery suitable for use in a desired application, such as a lead acid battery, a lithium-ion battery, a nickel-metal battery, or another rechargeable battery.

In an exemplary embodiment, motor 108 is realized as an electric motor. As shown in FIG. 1, motor 108 can be realized as a multi-phase alternating current (AC) motor that includes a set of windings (or coils), wherein each winding corresponds to a phase of motor 108. Although not illustrated, motor 108 includes a stator assembly (including the windings), a rotor assembly (including a ferromagnetic core), and a cooling fluid (i.e., coolant), as will be appreciated by one skilled in the art. Motor 108 may be an induction motor, a permanent magnet motor, or any type suitable for the desired application. Although not illustrated, motor 108 may also include a transmission integrated therein such that motor 108 and the transmission are mechanically coupled to at least some of the wheels of vehicle 102 through one or more drive shafts.

In the exemplary embodiment shown in FIG. 1, motor 108 is realized as a three-phase AC motor having a three-phase set of windings including a first winding 114 (for phase A), a second winding 116 (for phase B), and a third winding 118 (for phase C). It should be understood that the labeling of phases A, B, and C is for ease of description and is not intended to limit the subject matter in any way. Furthermore, it should be understood that although electric drive system 100 is described herein in the context of a three-phase motor, the subject matter described herein is independent of the number of phases of the motor.

In the exemplary embodiment shown in FIG. 1, power inverter module 106 includes six switches (which may be realized with semiconductor devices, such as transistors and/or switches) with antiparallel diodes (i.e., diodes which are antiparallel to each switch). Preferably, the switches are realized using insulated-gate bipolar transistors (IGBTs). As shown, the switches in power inverter module 106 are arranged into three phase legs (or pairs), with phase legs 120, 122, 124 each being coupled to a respective end of the windings 114, 116, 118. In this regard, phase leg 120 is coupled to first winding 114, phase leg 122 is coupled to second winding 116, and phase leg 124 is coupled to third winding 118. Thus, phase leg 120 may be referred to as the phase A leg, phase leg 122 the phase B leg, and phase leg 124 the phase C leg. When controlled in an appropriate manner, power inverter module operates to convert DC from energy source 104 into AC for motor 108.

In an exemplary embodiment, control module 110 is in operable communication and/or electrically coupled to power inverter module 106. Control module 110 is responsive to commands received from the driver of vehicle 102 (e.g., via an accelerator pedal) and provides commands to power inverter module 106 to control the output of the inverter phase legs 120, 122, 124. In an exemplary embodiment, control module 110 is configured to modulate and control power inverter module 106 using high frequency pulse width modulation (PWM). Control module 110 provides PWM signals to operate the switches within the inverter phase legs 120, 122, 124 to cause output voltages to be applied across windings 114, 116, 118 within motor 108 in order to operate motor 108 with a commanded torque. Although not illustrated, control module 110 may generate current and/or voltage commands for the phases of motor 108 in response to receiving a torque command from an electronic control unit (ECU), system controller, or another control module within vehicle 102. Further, in some embodiments, control module 110 may be integral with an ECU or another vehicle control module.

Figure 2:
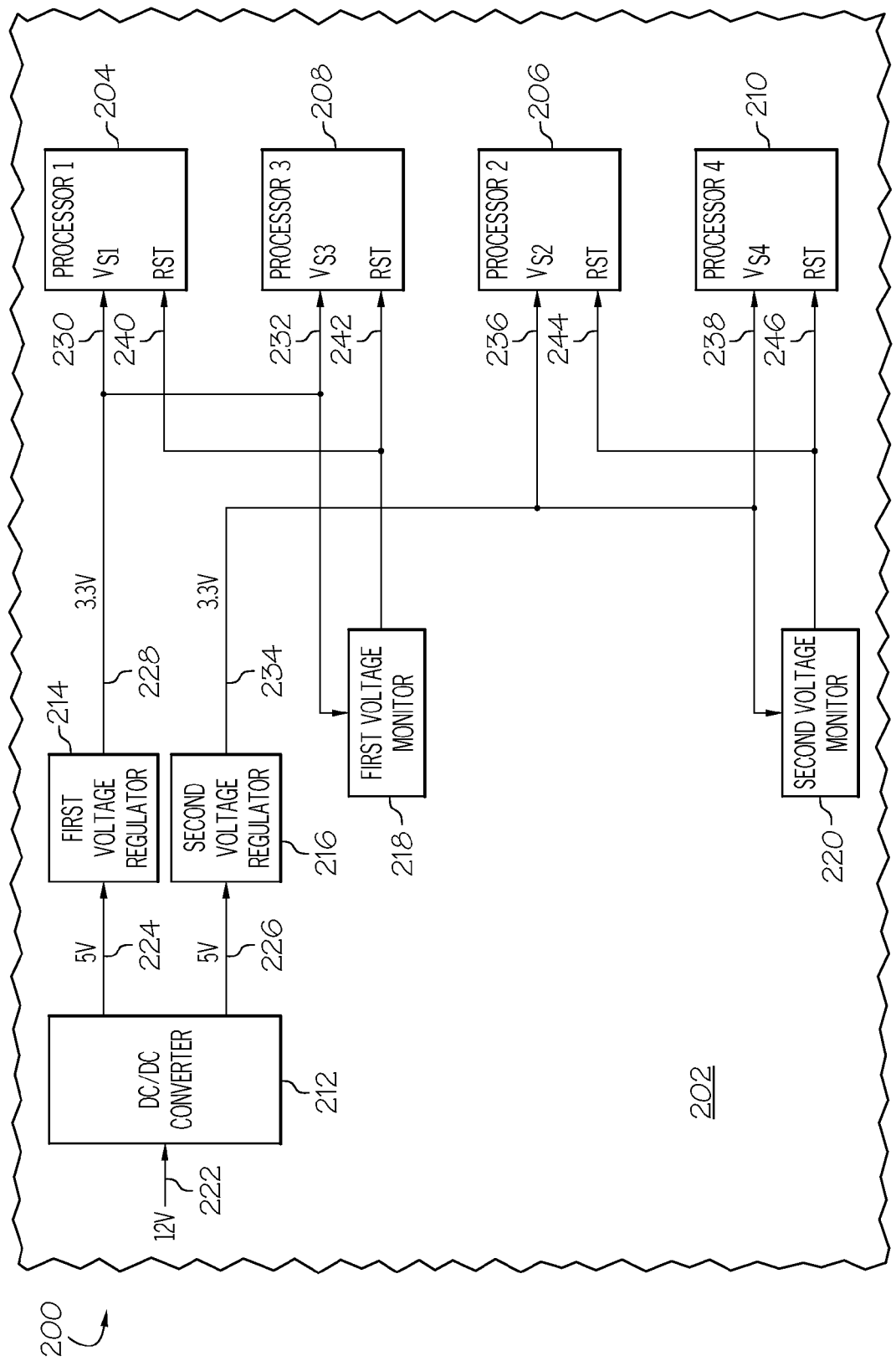
FIG. 2 is a schematic representation of an embodiment of a multi-processor controller suitable for use with an inverter of a vehicle-based electric traction system.

In practice, control module 110 may include, cooperate with, or be realized as a multi-processor controller. In this regard, FIG. 2 is a schematic representation of an embodiment of a multi-processor controller 200 suitable for use with an inverter (such as power inverter module 106) of a vehicle-based electric traction system. For simplicity and for ease of illustration, the output terminals of the processor devices are not shown in FIG. 2 (in practice, the outputs of the processor devices will be routed as needed for control of the inverter). Multi-processor controller 200 may be described herein in terms of functional and/or logical block components, and with reference to symbolic representations of operations, processing tasks, and functions that may be performed by various computing components or devices. It should be appreciated that the various block components shown in FIG. 2 may be realized by any number of hardware, software, and/or firmware components configured to perform the specified functions.

Multi-processor controller 200 includes a plurality of processor devices that cooperate to support the desired operation of the inverter. Although the actual number of processor devices may differ from one embodiment to another, the illustrated embodiment includes four physically distinct and separate processor devices, each implemented as a distinct integrated circuit chip or package. For this particular embodiment, all of the individual processor devices are mounted on a single physical circuit board 202 (a section of which is depicted in FIG. 2). In other words, even though the processor devices are realized as physically distinct packages, they are all mounted to one common board or substrate. Circuit board 202 may include a number of conductive traces or lines integrally formed thereon; these conductive elements facilitate the transfer of signals, data, and commands associated with the processor devices, and the provision of source, supply, and intermediate voltages throughout multi-processor controller 200.

The illustrated embodiment of multi-processor controller 200 includes a first processor device 204, a second processor device 206, a third processor device 208, and a fourth processor device 210. In practice, multi-processor controller 200 may utilize more or less than four processor devices, and the processor devices may be configured in a master-slave architecture. As mentioned above, the processor devices are suitably configured and programmed to control the operation of an inverter in a vehicle-based electric traction system. More specifically, processor devices 204, 206, 208, 210 are suitably configured to control the operation of the inverter to achieve the desired power flow between the energy source (e.g., energy source 104) and the electric motor (e.g., motor 108).

Each processor device shown in FIG. 2 may be implemented or realized as an integrated circuit component that is designed to perform the functions described here. In addition, each processor device may be suitably configured to support inter-processor data communication using an appropriate data transfer protocol. The processing core of each processor device may be similar or identical and all of the processor devices may be realized using the same physical device and packaging. In a master-slave implementation, the slave processor devices can be realized as identical components, while the master processor device can be realized as a different component (to accommodate the enhanced functionality of the master processor device, relative to the slave processor devices).

The processor devices in multi-processor controller 200 can be arbitrarily grouped into any number of subsets. For this embodiment, first processor device 204 and third processor device 208 represent one proper subset of the four processor devices, and second processor device 206 and fourth processor device 210 represent another proper subset of the four processor devices. These two subsets are mutually exclusive subsets in that each processor device is included in only one of the two subsets.

Multi-processor controller 200 also includes, without limitation: a DC-to-DC converter 212; a first voltage regulator 214; a second voltage regulator 216; a first voltage monitor 218; and a second voltage monitor 220. As depicted in FIG. 2, first voltage regulator 214 and first voltage monitor 218 are associated with the first subset of processor devices (i.e., first processor device 204 and third processor device 208), while second voltage regulator 216 and second voltage monitor 220 are associated with the second subset of processor devices (i.e., second processor device 206 and fourth processor device 210).

DC-to-DC converter 212 is a voltage converter that is suitably configured to receive a DC source voltage 222 and generate unregulated DC voltage(s) from DC source voltage 222. The illustrated embodiment of DC-to-DC converter 212 receives DC source voltage 222 at its input node, converts DC source voltage 222 into a first unregulated DC voltage 224 at one output node, and into a second unregulated DC voltage 226 at another output node. In alternate embodiments, DC-to-DC converter 212 may be configured to generate one unregulated DC voltage that is used as an input voltage to both first voltage regulator 214 and second voltage regulator 216.

In certain embodiments, DC source voltage 222 is provided by an electrical system of the host vehicle. In a hybrid vehicle, for example, this electrical system can be the relatively low twelve volt system that is utilized for low-power accessory subsystems. In this example, first unregulated DC voltage 224 is substantially equal to second unregulated DC voltage 226 because first voltage regulator 214 and second voltage regulator 216 are realized as identical or equivalent components. As used in this context, "substantially equal" means that first unregulated DC voltage 224 and second unregulated DC voltage 226 differ by less than about five percent, or that they are equal to within a reasonable tolerance achievable by practical DC-to-DC converters.

First voltage regulator 214 is coupled to DC-to-DC converter 212 such that it receives first unregulated DC voltage 224 at its input node. First voltage regulator 214 is suitably configured to generate, from first unregulated DC voltage 224, a first regulated DC supply voltage 228 at its output node. The output node of first voltage regulator 214 is coupled to the respective supply voltage nodes 230, 232 of first processor device 204 and third processor device 208. Thus, first regulated DC supply voltage 228 serves as the supply voltage for both first processor device 204 and third processor device 208. For the exemplary embodiment shown in FIG. 2, first unregulated DC voltage 224 is five volts, and first regulated DC supply voltage is 3.3 volts. Of course, these voltages can vary to suit the needs of the particular application.

Second voltage regulator 216 is coupled to DC-to-DC converter 212 such that it receives second unregulated DC voltage 226 at its input node. Second voltage regulator 216 is suitably configured to generate, from second unregulated DC voltage 226, a second regulated DC supply voltage 234 at its output node. The output node of second voltage regulator 216 is coupled to the respective supply voltage nodes 236, 238 of second processor device 206 and fourth processor device 210. Thus, second regulated DC supply voltage 234 serves as the supply voltage for both second processor device 206 and fourth processor device 210. For the exemplary embodiment shown in FIG. 2, second unregulated DC voltage 226 is five volts, and second regulated DC supply voltage is 3.3 volts. Of course, these voltages can vary to suit the needs of the particular application, and these voltages need not be the same as the counterpart voltages associated with the operation of first voltage regulator 214. That said, in certain embodiments where all of the processor devices have the same nominal supply voltage requirements, first regulated DC supply voltage 228 is substantially equal to second regulated DC supply voltage 234. As used in this context, "substantially equal" means that first regulated DC supply voltage 228 and second regulated DC supply voltage 234 differ by less than about five percent, or that they are equal to within a reasonable tolerance achievable by practical DC-to-DC converters.

Notably, each voltage regulator 214, 216 is configured to generate a respective regulated supply voltage for a different one of the mutually exclusive subsets of the processor devices. In other words, voltage regulator 214 generates first regulated DC supply voltage 228 for the first subset of processor devices, while voltage regulator 216 generates second regulated DC supply voltage 234 for the second subset of processor devices. For the exemplary embodiment described here, voltage regulators 214, 216 generate the same nominal voltage (e.g., 3.3 volts) as the regulated supply voltage.

First voltage monitor 218 is coupled to supply voltage nodes 230, 232 such that it can receive and monitor first regulated DC supply voltage 228. In practice, first voltage monitor 218 detects whether first regulated DC supply voltage 228 remains within a nominal operating voltage range specified for first processor device 204 and third processor device 208. If first voltage monitor 218 determines that first regulated DC supply voltage 228 has drifted outside this nominal operating voltage range, then it will reset, disable, or pause the operation of first processor device 204 and third processor device 208. Accordingly, first voltage monitor 218 may be coupled to a reset input 240 of first processor device 204 and to a reset input 242 of third processor device 208, as shown in FIG. 2. If the monitored DC supply voltage 228 drifts outside the nominal operating voltage range, then first voltage monitor 218 will assert and maintain a "Reset" command or control signal at reset inputs 240, 242 until the DC supply voltage 228 returns to a nominal operating voltage. This feature enables multi-processor controller 200 to take corrective action and reduce errors that might be caused by processor devices 204, 208 while processor devices 206, 210 (which are supported by second voltage regulator 216) remain active.

Similarly, second voltage monitor 220 is coupled to supply voltage nodes 236, 238 such that it can receive and monitor second regulated DC supply voltage 234. In practice, second voltage monitor 220 detects whether second regulated DC supply voltage 234 remains within a nominal operating voltage range specified for second processor device 206 and fourth processor device 210, as described above for first voltage monitor 218. Thus, second voltage monitor 220 may be coupled to a reset input 244 of second processor device 206 and to a reset input 246 of fourth processor device 210, as shown in FIG. 2. Preferred embodiments, such as that illustrated in FIG. 2, allow a plurality of voltage monitors to monitor a plurality of regulated supply voltages for different subsets of processor devices.

In practice, DC-to-DC converter 212 can be realized as a combination of components or integrated circuit devices. The other elements shown in FIG. 2, however, can be realized as physically distinct components, packages, or integrated circuit devices. For this particular embodiment, the individual processor devices 204, 206, 208, 210, DC-to-DC converter 212, first voltage regulator 214, second voltage regulator 216, first voltage monitor 218, and second voltage monitor 220 are all mounted on the same physical circuit board 202. In other words, even though multi-processor controller 200 can be realized using a number of physically distinct packages, they are all mounted to one common board or substrate.

It should be appreciated that the multi-processor controller architecture and topology described herein can be utilized in applications other than vehicle-based inverters and electric traction systems. The inverter application mentioned above is merely one suitable use, and the subject matter is not limited or restricted to such a use.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A multi-processor controller for an inverter in an electric traction system of a vehicle, the multi-processor controller comprising:
   a first processor device having a first supply voltage node;
   a second processor device having a second supply voltage node;
   a first voltage regulator having a first output voltage node coupled to the first supply voltage node, the first voltage regulator being configured to generate a first regulated supply voltage for the first processor device; and
   a second voltage regulator having a second output voltage node coupled to the second supply voltage node, the second voltage regulator being configured to generate a second regulated supply voltage for the second processor device; wherein
   the first processor device and the second processor device are configured to control operation of the inverter.

2. The multi-processor controller of claim 1, further comprising a voltage converter coupled to the first voltage regulator and to the second voltage regulator, the voltage converter being configured to convert a source voltage into a first unregulated voltage input for the first voltage regulator, and into a second unregulated voltage input for the second voltage regulator.

3. The multi-processor controller of claim 2, wherein:
   the source voltage is a direct current (DC) source voltage provided by an electrical system of the vehicle; and
   the voltage converter comprises a DC-to-DC converter configured to generate, from the DC source voltage, a first DC voltage as the first unregulated voltage input, and to generate, from the DC source voltage, a second DC voltage as the second unregulated voltage input.

4. The multi-processor controller of claim 3, wherein the first DC voltage is substantially equal to the second DC voltage.

5. The multi-processor controller of claim 1, wherein the first regulated supply voltage is substantially equal to the second regulated supply voltage.

6. The multi-processor controller of claim 1, further comprising a third processor device having a third supply voltage node, wherein:
   the first output voltage node is coupled to the third supply voltage node;
   the first voltage regulator is configured to generate the first regulated supply voltage for the first processor device and the third processor device; and
   the first processor device, the second processor device, and the third processor device are configured to control operation of the inverter.

7. The multi-processor controller of claim 6, further comprising a fourth processor device having a fourth supply voltage node, wherein:
   the second output voltage node is coupled to the fourth supply voltage node;

the second voltage regulator is configured to generate the second regulated supply voltage for the second processor device and the fourth processor device; and the first processor device, the second processor device, the third processor device, and the fourth processor device are configured to control operation of the inverter.

8. The multi-processor controller of claim 1, further comprising:
a first voltage monitor coupled to the first supply voltage node, the first voltage monitor being configured to reset the first processor device if the first regulated supply voltage drifts outside a nominal operating voltage range for the first processor device; and
a second voltage monitor coupled to the second supply voltage node, the second voltage monitor being configured to reset the second processor device if the second regulated supply voltage drifts outside a nominal operating voltage range for the second processor device.

9. The multi-processor controller of claim 1, further comprising a single physical circuit board, wherein the first processor device, the second processor device, the first voltage regulator, and the second voltage regulator are all mounted on the single physical circuit board.

10. An electric drive system for a vehicle, the electric drive system comprising:
an energy source;
an electric motor;
an inverter coupled between the energy source and the electric motor, the inverter being configured to convert direct current from the energy source into alternating current for the electric motor; and
a multi-processor controller coupled to the inverter, the multi-processor controller comprising:
a plurality of processor devices grouped into a plurality of mutually exclusive subsets and configured to control operation of the inverter to achieve a desired power flow between the energy source and the electric motor; and
a plurality of voltage regulators, each being configured to generate a respective regulated supply voltage for a different one of the mutually exclusive subsets.

11. The electric drive system of claim 10, wherein:
the plurality of processor devices comprises a first processor device, a second processor device, a third processor device, and a fourth processor device;
the plurality of voltage regulators comprises a first voltage regulator coupled to the first processor device and the third processor device, and a second voltage regulator coupled to the second processor device and the fourth processor device;
the first voltage regulator is configured to generate a first regulated supply voltage for the first processor device and the third processor device; and
the second voltage regulator is configured to generate a second regulated supply voltage for the second processor device and the fourth processor device.

12. The electric drive system of claim 10, further comprising a plurality of voltage monitors, each being configured to monitor the respective regulated supply voltage for a different one of the mutually exclusive subsets, and to detect if the respective regulated supply voltage drifts outside its nominal operating voltage range.

13. The electric drive system of claim 10, further comprising a voltage converter coupled to the plurality of voltage regulators, the voltage converter being configured to convert a source voltage into unregulated voltage inputs for the plurality of voltage regulators.

14. The electric drive system of claim 13, wherein:
the source voltage is a direct current (DC) source voltage provided by an electrical system of the vehicle; and
the voltage converter comprises a DC-to-DC converter configured to generate the unregulated voltage inputs from the DC source voltage.

15. The electric drive system of claim 10, wherein each of the plurality of voltage regulators is configured to generate the same nominal voltage as its respective regulated supply voltage.

16. The electric drive system of claim 10, further comprising a single physical circuit board, wherein the plurality of processor devices and the plurality of voltage regulators are all mounted on the single physical circuit board.

17. A multi-processor controller comprising:
a first voltage regulator configured to generate a first regulated supply voltage at its output node;
a second voltage regulator configured to generate a second regulated supply voltage at its output node;
a first plurality of processor devices, each having a respective supply voltage node coupled to the output node of the first voltage regulator to receive the first regulated supply voltage; and
a second plurality of processor devices, each having a respective supply voltage node coupled to the output node of the second voltage regulator to receive the second regulated supply voltage.

18. The multi-processor controller of claim 17, further comprising a voltage converter having a first output coupled to an input of the first voltage regulator, and having a second output coupled to an input of the second voltage regulator, the voltage converter being configured to convert a source voltage into a first unregulated voltage generated at its first output, and into a second unregulated voltage generated at its second output.

19. The multi-processor controller of claim 17, further comprising:
a first voltage monitor coupled to the output node of the first voltage regulator and coupled to each of the first plurality of processor devices, the first voltage monitor being configured to reset each of the first plurality of processor devices if the first regulated supply voltage drifts outside a nominal operating voltage range for the first plurality of processor devices; and
a second voltage monitor coupled to the output node of the second voltage regulator and coupled to each of the second plurality of processor devices, the second voltage monitor being configured to reset each of the second plurality of processor devices if the second regulated supply voltage drifts outside a nominal operating voltage range for the second plurality of processor devices.

20. The multi-processor controller of claim 17, further comprising a single physical circuit board, wherein the first voltage regulator, the second voltage regulator, the first plurality of processor devices, and the second plurality of processor devices are all mounted on the single physical circuit board.

* * * * *